United States Patent
Day et al.

(10) Patent No.: US 8,952,845 B1
(45) Date of Patent: Feb. 10, 2015

(54) DYNAMIC RELATIVE INTERNAL ALIGNMENT CALIBRATION

(75) Inventors: Dana L. Day, Turnersville, NJ (US); Alan M. Rosenwinkel, Haddonfield, NJ (US); David B. Arnal, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 278 days.

(21) Appl. No.: 13/524,291

(22) Filed: Jun. 15, 2012

Related U.S. Application Data

(60) Provisional application No. 61/497,162, filed on Jun. 15, 2011.

(51) Int. Cl.
*G01S 17/88* (2006.01)
*G01S 13/86* (2006.01)
*H01Q 1/12* (2006.01)
*H01Q 1/34* (2006.01)

(52) U.S. Cl.
CPC .............. *G01S 17/88* (2013.01); *H01Q 1/1214* (2013.01); *G01S 13/865* (2013.01); *H01Q 1/34* (2013.01)
USPC ............................................. 342/167; 33/286

(58) Field of Classification Search
CPC ................. G01S 17/88; G01S 13/865

USPC ........................................................ 342/167
See application file for complete search history.

(56) References Cited

U.S. PATENT DOCUMENTS

| | | | | |
|---|---|---|---|---|
| 4,334,775 A | * | 6/1982 | Breecher et al. | 356/139.03 |
| 4,931,803 A | * | 6/1990 | Shimko | 342/371 |
| 5,455,670 A | * | 10/1995 | Payne et al. | 356/5.1 |
| 5,982,481 A | * | 11/1999 | Stone et al. | 356/152.2 |
| 6,293,027 B1 | * | 9/2001 | Elliott et al. | 33/546 |
| 7,669,339 B1 | * | 3/2010 | Arnal et al. | 33/286 |
| 8,567,077 B2 | * | 10/2013 | Wernig et al. | 33/286 |

OTHER PUBLICATIONS

Day et al. "Measuring Structural Flexure to Improve Precision Tracking". Jun. 21, 1999. pp. 1-5.*

* cited by examiner

*Primary Examiner* — Matthew M Barker
(74) *Attorney, Agent, or Firm* — Howard IP Law Group, PC

(57) ABSTRACT

A method for adapting the pointing of a radar system in response to distortion of a deckhouse support structure supporting plural antenna arrays of the radar system is provided. The method comprises the steps of making repeated measurements between at least one laser tracker located within the support structure and laser targets mounted within the support structure, and comparing the current measurements with previous measurements to determine physical bias introduced into the structure.

15 Claims, 9 Drawing Sheets

DYNAMIC RELATIVE INTERNAL ALIGNMENT CALIBRATION

CROSS-REFERENCE TO RELATED APPLICATION

This application claims the benefit of U.S. Provisional Patent Application Ser. No. 61/497,162, filed Jun. 15, 2011, the entire disclosure of which is incorporated by reference herein.

FIELD OF THE INVENTION

This disclosure generally relates to radar systems, and more specifically, to systems and methods for performing an accurate relative alignment between multiple planar radar arrays.

BACKGROUND

Some modern radar systems use planar arrays of antenna elements to transduce electromagnetic energy between guided and unguided forms. It is difficult to obtain hemispheric coverage with a single planar array, so it has become common practice to use a plurality of generally co-located, co-acting planar arrays, each providing coverage of a portion, such as a quarter, of a hemisphere. The transmission and reception of signals from the various planar arrays are coordinated in order to avoid, inasmuch as possible, large steps in apparent track position when a target moves from the coverage region of one planar array to that of another.

The various co-acting planar antenna arrays of a radar system intended for covering a broad region cannot be at precisely a prescribed orientation. Thus, the planar arrays must be physically supported in close proximity to each other, and with precisely accurate as-installed measured relative angular orientations. This is accomplished by an "internal" structure. Put another way, there must be an accurate relative alignment between multiple planar radar arrays internal to the structure supporting such arrays for the purpose of engaging and/or observing a plurality of targets in a hemispherical environment. A singular measurement may not be sufficient for some applications because the structure will expand and contract or flex abnormally under environmental conditions. This flexure and expansion/contraction of the various portions of the antenna array support structure can be expected to adversely affect the operation of the radar system as a whole.

In some cases, antenna arrays of a radar system may be mounted on the superstructure of a ship. In such systems, legacy measurements of the alignment of the antenna arrays have been made by means of one reference theodolite mounted at the ship centerline on an exterior weather deck and another theodolite mounted in the proximity of an antenna array from which it may note the locations of particular exterior antenna-related scale targets by sweeping a plane with a right angle attachment and generating reference angles from the reference theodolites. Each theodolite is therefore referenced to a ship specific centerline and horizontal reference for these measurements.

More recent methods of alignment substitute a laser tracker for the theodolite in proximity to an antenna array, and an optical retroreflector for the scale targets. The laser tracker still has to pick up the same centerline and horizontal plane references. The laser tracker, unlike the theodolite, can precisely locate the retroreflector target positions in angle and distance. Naturally, the location of the target or retroreflector must be selected to be visible from the location of the tracking instrument. However, because the antenna arrays face in different directions, some of the antenna arrays will be hidden from the view of an instrument placed in proximity to the exterior of the antenna array, and in that case additional instruments may be required at other locations, in order to complete the measurements of all of the arrays.

Improved or alternative alignment methods are desired.

SUMMARY

A method according to an aspect of the disclosure includes adapting the pointing of a radar system in response to distortion of a deckhouse support structure supporting plural antenna arrays of the radar system. The method comprises the steps of making repeated measurements between at least one laser tracker located within the support structure and laser targets mounted within the support structure, and comparing the current measurements with previous measurements to determine physical bias introduced into the structure. In a particular mode of the method, the further step is performed, concurrently with the step of making measurements within the deckhouse, of making measurements from locations external to the support structure. The measurements made from within the support structure are correlated with the measurements made external to the support structure to thereby establish an initial condition. In another mode of the method, the step of making measurements between at least one laser tracker located within the support structure and laser targets mounted with the support structure includes the step of making dimensional measurements to calculate the resulting angles.

A radar system according to an aspect of the disclosure comprises an antenna array, and a support structure supporting the antenna array at an interface between an interior and exterior of the support structure. The support structure may be subject to environmental distortion which perturbs the pointing of the antenna array relative to its local environment. The radar system includes a laser tracker-laser reflector arrangement located within the interior of the support structure for measuring physical alignment biases of the antenna array relative to a reference system. In another embodiment, the radar system further comprises an alignment adaptation function for adjusting the effective pointing direction of the antenna array in response to the physical alignment biases.

Figure 1:
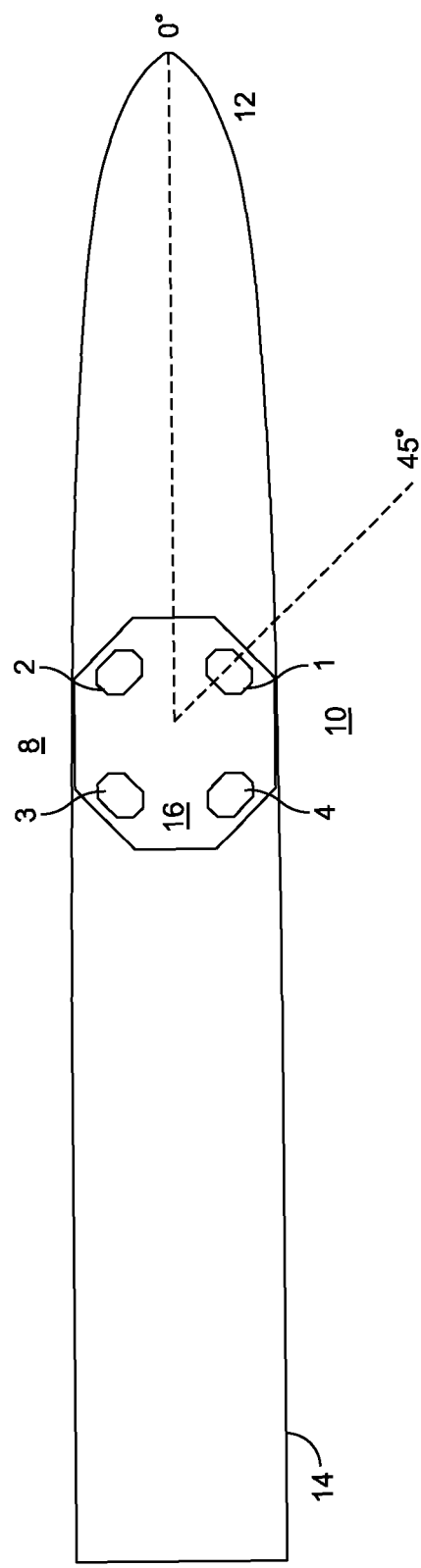
FIG. 1 is a simplified plan representation of a ship including a "deckhouse" structure supporting a plurality of planar antenna arrays.

All drawings are schematic and are not intended to show any dimensions to scale.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

A Dynamic Relative Internal Alignment Calibration process according to embodiments of the present disclosure is used to physically measure the relative alignment between the element sensors and emitters from within the physical structure and tie those measurements to the legacy measurement processes during a concurrent initialization event. In one embodiment, one or more laser tracker units may be mounted within the structure to measure a minimum of three (3) fixed retroreflector points per element sensor or emitter. A laser tracker system may be "taught" the location of these points and a constellation of at least three (3) reference system points in a central volume of the structure. A secondary reference system of at least three (3) points can be accessed as a check of the primary reference system. Each radar array has to have at least three (3) target points on the backside of the radar fixture that correspond to legacy target positions on the outside face of the radar array. As part of initialization, a legacy process measurement of an element sensor or emitter would be performed coincident in time with a laser tracker measurement when the structure is in thermal equilibrium. A series of such initialization measurements would be performed to establish the potential errors of the process. Once the initialization process creates a calibrated system, the laser tracker system can automatically produce measured alignment parameters to the radar's combat system to correct sensor and emitter pointing angles.

Legacy alignment processes are performed on individual elements after a construction and installation period, and sometimes verified by an alternate process as an integrated system. After several years, the legacy alignment process would be re-performed and sometimes verified by an alternate process as an integrated system. Error budgets of each integrated system had to allow for large biases for structural flexure because those biases were unmeasured. Current missions require more accuracy around the clock that cannot be met by legacy alignment processes that are not performed with immediacy.

Embodiments of the present disclosure would be able to take a complete set of precision alignment measurements in a short period of time, and calculate calibration values to correct for current structural flexure. This removes the unknown error budget component for structural flexure for a combat system engagement. Tying this calibration in with a current measurement relative to true by a single sensor would then calibrate all sensors and emitters on this structure to true coordinates. This would be a complete calibration of alignment relative to true coordinates in minutes, which would be accurate for the time of an extended engagement.

FIG. 1 is a simplified plan view of a ship 10 useful for describing embodiments of the present disclosure in further detail. Ship 10 includes a bow 12 and a stern 14 oriented with a longitudinal axis x at 0°. Ship 10 carries an exemplary radar system 8. Radar system 8 includes four antenna arrays 1, 2, 3, 4. Antenna arrays 1, 2, 3, 4 are supported by a deckhouse or superstructure 16. Antenna array 1 is oriented or aimed at generally 45° relative to axis x, antenna array 2 oriented at generally 315°, antenna 3 is oriented at generally 225°, and antenna 4 is oriented at generally 135°. In the illustrated system, antenna arrays 1, 2, 3, 4 are fixed in position by the structure of deckhouse 16.

Figure 2:
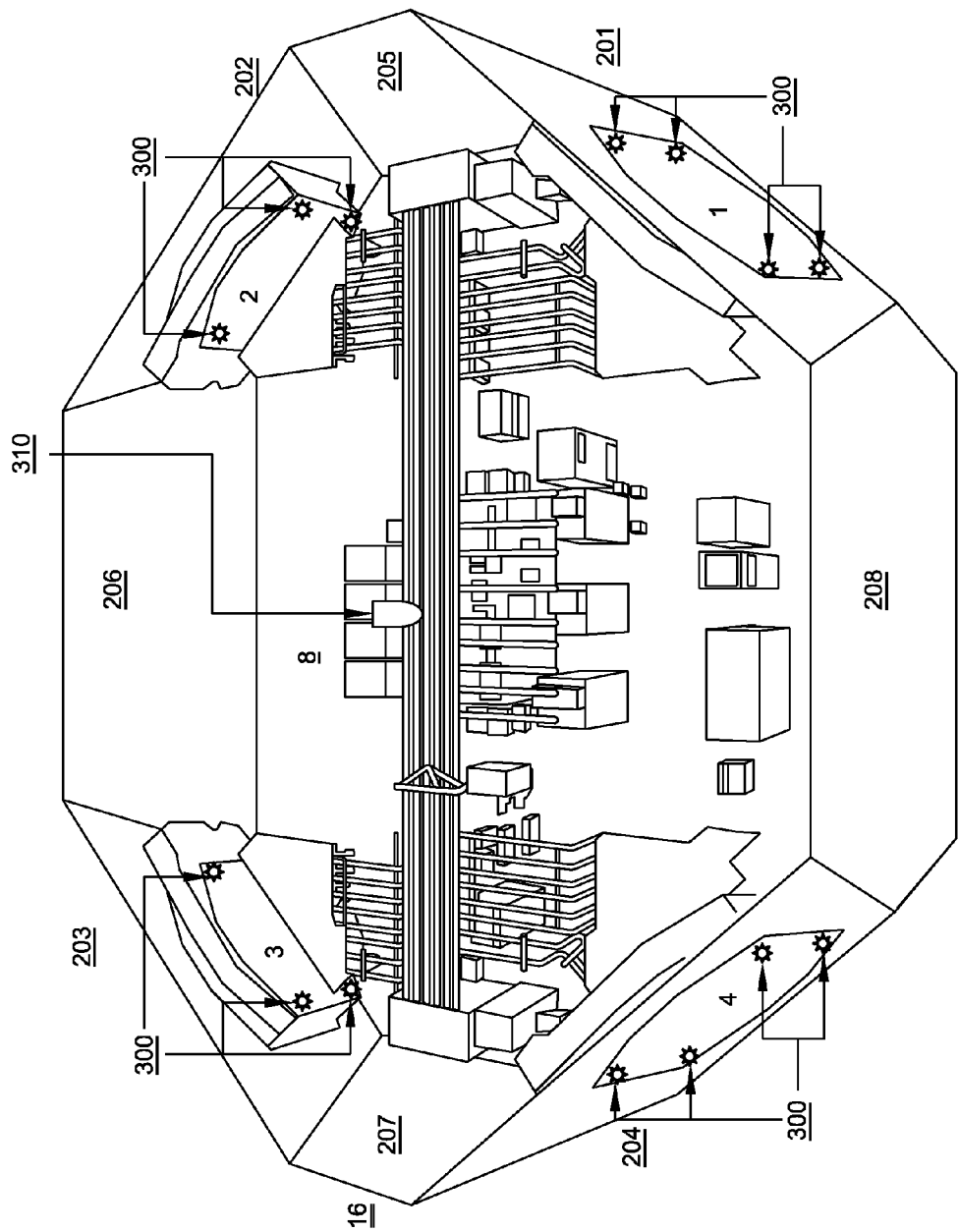
FIG. 2 is a simplified, partially cut away perspective view of the interior of the deckhouse of FIG. 1.

FIG. 2 is a partially exploded perspective view of the interior of the deckhouse 16 of FIG. 1, showing principal portions of radar system 8. In FIG. 2, elements corresponding to those of FIG. 1 are designated by like reference numerals. The interior portions of antenna arrays 2, 3, and exterior surfaces of antenna arrays 1, 4, are illustrated. Antenna array 1 is ultimately supported by a deckhouse 16 wall 201, antenna array 2 is ultimately supported by deckhouse wall 202, antenna array 3 is ultimately supported by deckhouse wall 203, and antenna array 4 is supported by wall 204. A "front" wall 205 joins walls 201 and 202, a "rear" wall 207 joins walls 203 and 204, a "side" wall 206 joins walls 202 and 203, and a "side" wall 208 joins walls 201 and 204. Radar system 8 includes various cabinet racks and equipment, elongated paths for the flow of electrical power, liquid coolant, electronic data, and the like that create obstacles to work around when performing measurements.

According to one embodiment of the present disclosure, one or more laser tracker units are mounted on the support structure within the deckhouse 16 to measure a minimum of three (3) fixed retroreflector points per element sensor, emitter, or transponder (i.e. per antenna array). As will be understood by one of ordinary skill in the art, a laser tracker is an instrument which may be used to accurately measure an object by determining the positions of optical targets (e.g. retroreflectors 300) fixed to the object. Retroreflectors 300 are operative to reflect a laser beam generated by the laser tracking back in the direction of its origin (i.e. back to the laser tracker) for measuring position and/or movement of the object. Accordingly, these retroreflector points require Line-of-Sight (LOS) positioning with respect to the laser tracker. It should be noted that this need for LOS positioning may require more than one laser tracker unit 310 in the design.

Figure 3:
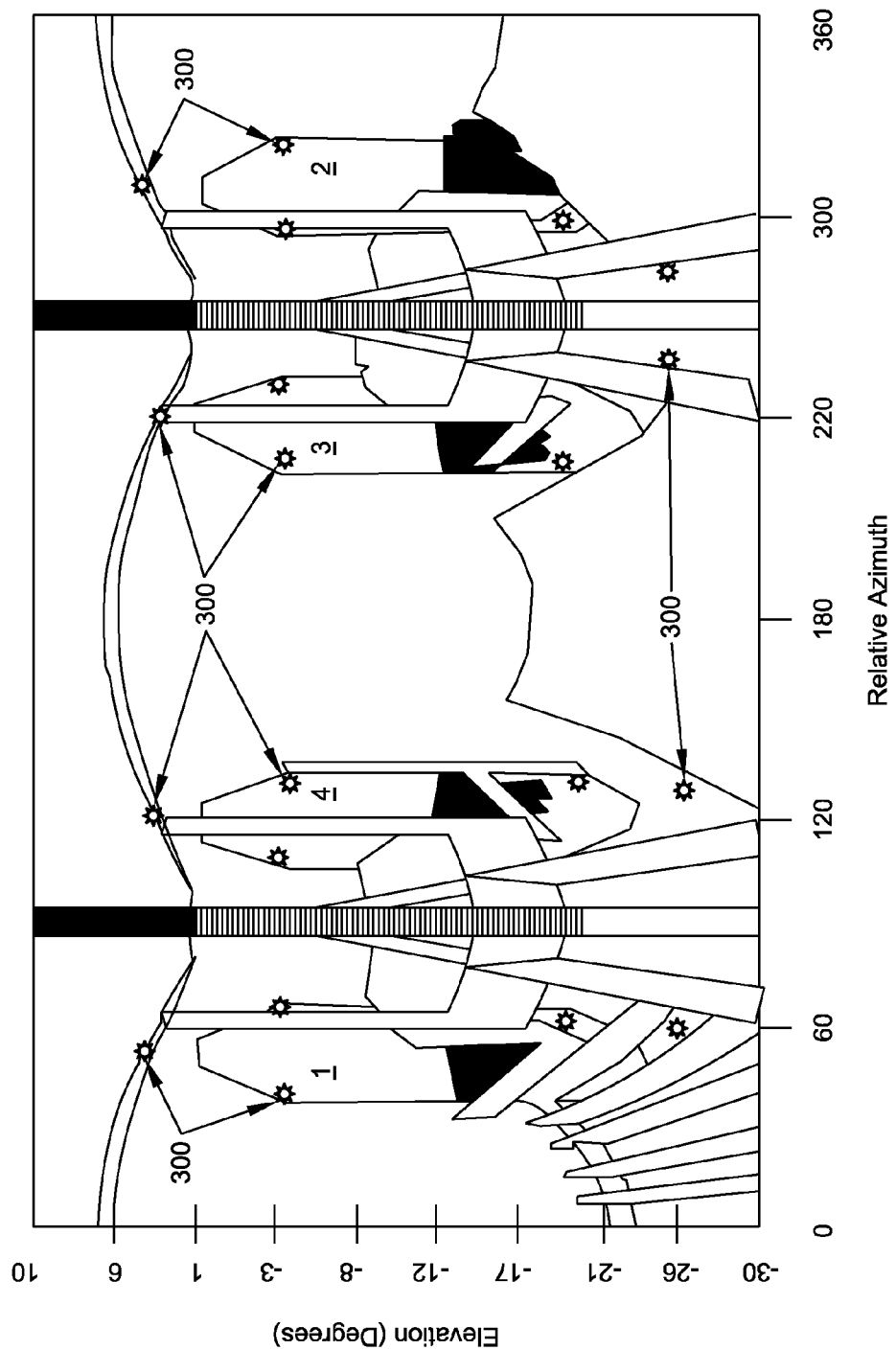
FIG. 3 is a developed view of the interior structure of FIG. 2 from the vantage point of a laser tracker suspended upside down from an overhead beam extending from 90° relative to 270° relative azimuth, showing the support structure for the antenna arrays.

FIG. 3 is a simplified representation of a view of the interior of the deckhouse of FIG. 2 as seen from the vantage point of a laser tracker, such as laser tracker 310 of FIG. 2, mounted on or near the ceiling of deckhouse 16. As mentioned, laser tracker 310 is capable of varying its elevation and azimuth pointing direction, and thus, may develop a panoramic view of the interior of the deckhouse. In the illustrated representation of FIG. 3, the azimuth extent of the view is 0° to 360°, and the elevation range extends from −30° to +10°. The 0° azimuth position corresponds to the bow direction along the longitudinal axis of ship 10, and the 180° position represents a view in the aft direction, also along the longitudinal axis of ship 10. In FIG. 3, elements corresponding to those of FIG. 2, such as antenna arrays 1, 2, 3, 4 and retroreflectors 300 are designated by like reference numerals.

Utilizing the above-described arrangement, in one embodiment of the present disclosure, an initial alignment of a system may include a legacy process (external to the deckhouse) measurement of an element sensor, emitter, or transponder, performed concurrently in time with a laser tracker (inside the deckhouse) measurement according to embodiments of this disclosure, at a time at which the structure is in thermal equilibrium. A series of such initialization measurements are performed to establish the potential biases for the process. Once the initialization process creates a calibrated system, the laser tracker system can provide measured alignment parameters to the combat system (e.g. an electronic control and/or processing system of the radar) to correct for positioning changes or errors in the locations of the sensors and emitters.

Figure 4:
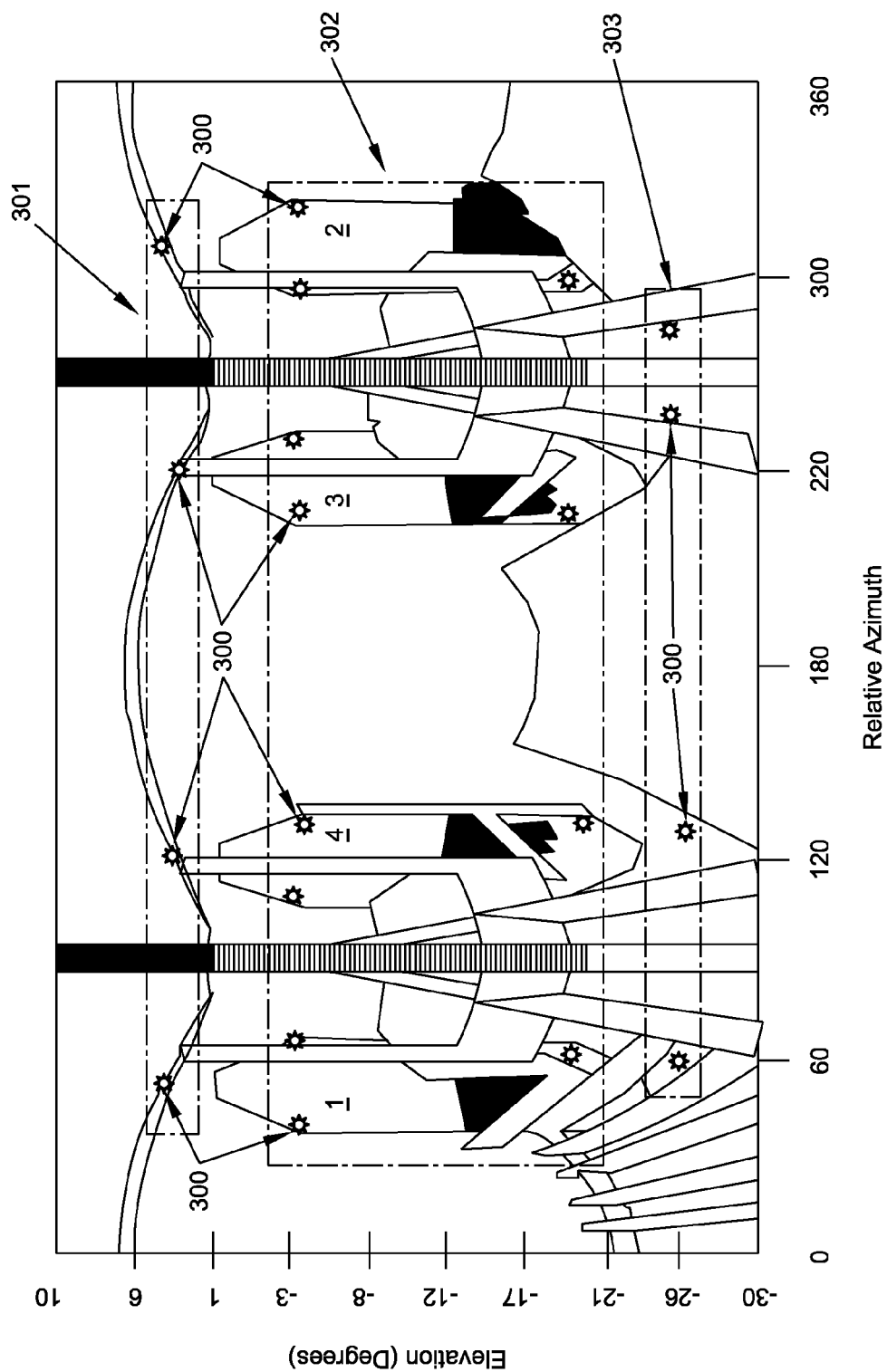
FIG. 4 is a developed view similar to FIG. 3, showing the locations of Ready Reference Reflectors (retroreflectors), Secondary Reference Reflectors and the Antenna Array Reflectors.

As mentioned, planar antenna arrays 1, 2, 3, 4 are mounted in, or "through", ship deckhouse 16. The process of measuring the array alignment from within the deckhouse involves first establishing laser tracker retroreflector target positions within the deckhouse and a reference coordinate system relative to the ship coordinate system. Referring generally to FIG. 4, exemplary retroreflectors 300 and their positions are illustrated. For the purposes of this description, these retroreflectors may be designated into groups, such as "Ready Reference Reflectors" 301, "Array Reflectors" 302, and "Secondary Reference Reflectors" 303. "Ready Reference Reflectors" 301 are not blocked by normal personnel movements within the deckhouse because they are in the overhead region and are used as a common bridge geometry between the antenna array measurements and maintain the ship reference system from an initial condition. The "Array Reflectors" 302 are attached to the backside of the antenna arrays and biases between these interior points and the exterior points are developed from an initial condition. The "Secondary Reference Reflectors" 303 may occasionally be blocked by personnel and the measurements of these points would provide information relative to distortions between the "Ready Reference Reflectors" 301 overhead structure and lower deck structure. Ready Reference Reflectors 301 and Secondary Reference Reflectors 303 may comprise all or part of a secondary alignment reference system defined (for the disclosed process) within the deckhouse structure.

This secondary alignment reference system may provide a common reference system for continued measurements within the structure. In one embodiment, there will be at least three (3) primary, Ready Reference Reflectors or points, as well as at least three (3) Secondary Reference Reflectors or points within this reference system. Using this system, measurements to a minimum of three (3) array retroreflectors or points on the backside of each planar array are made initially, nominally coincident in time with an exterior measurement for calibration. Subsequent measurements utilize the calibration (deltas) to transform from interior measurements to exterior referenced values. These subsequent measurements can then be performed by the laser tracker almost continuously and used to update system alignment parameters by passing the resulting data file, such as an ASCII file, to the tactical programming of the radar's control processors.

Figure 5:
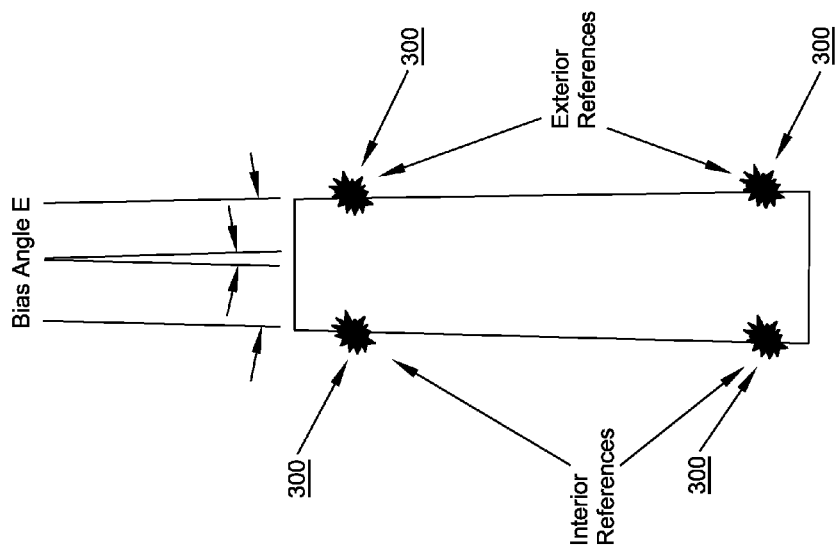
FIG. 5 is a diagram of the azimuthal Euler Angle bias between an external reference line and internal reference line (assuming the elevation and crossroll Euler Angles are zero)
Figure 6:
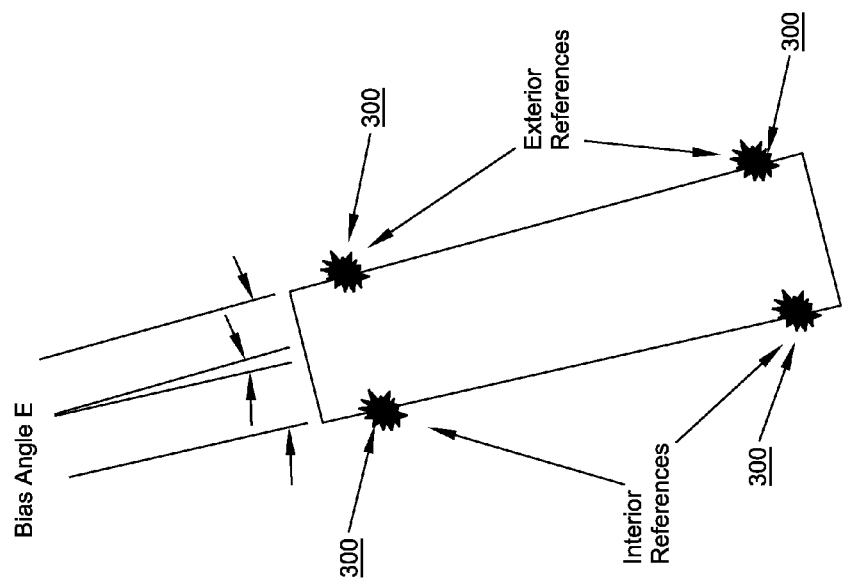
FIG. 6 is a diagram of the elevation Euler Angle bias between an external reference line and internal reference line (assuming the azimuthal and crossroll Euler Angles are zero)
Figure 7:
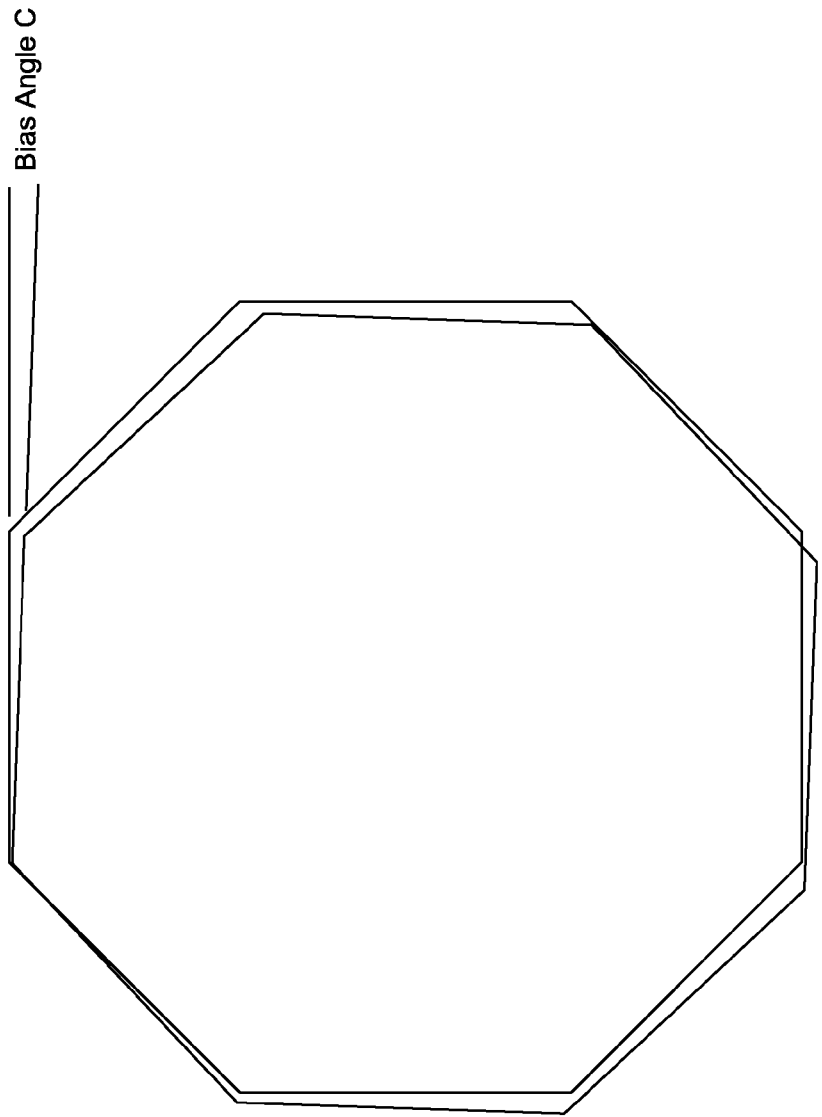
FIG. 7 is a diagram of the crossroll Euler Angle bias between an external reference line and internal reference line (assuming the azimuthal and elevation Euler Angles are zero)

The calibration bias deltas may include, for example, the azimuthal Euler Angle bias between an external reference line and internal reference line (FIG. 5, assuming the elevation and crossroll Euler Angles are zero), the elevation Euler Angle bias between an external reference line and internal reference line (FIG. 6, assuming the azimuthal and crossroll Euler Angles are zero), and the crossroll Euler Angle bias between an external reference line and internal reference line (FIG. 7, assuming the azimuthal and elevation Euler Angles are zero).

Figure 8:
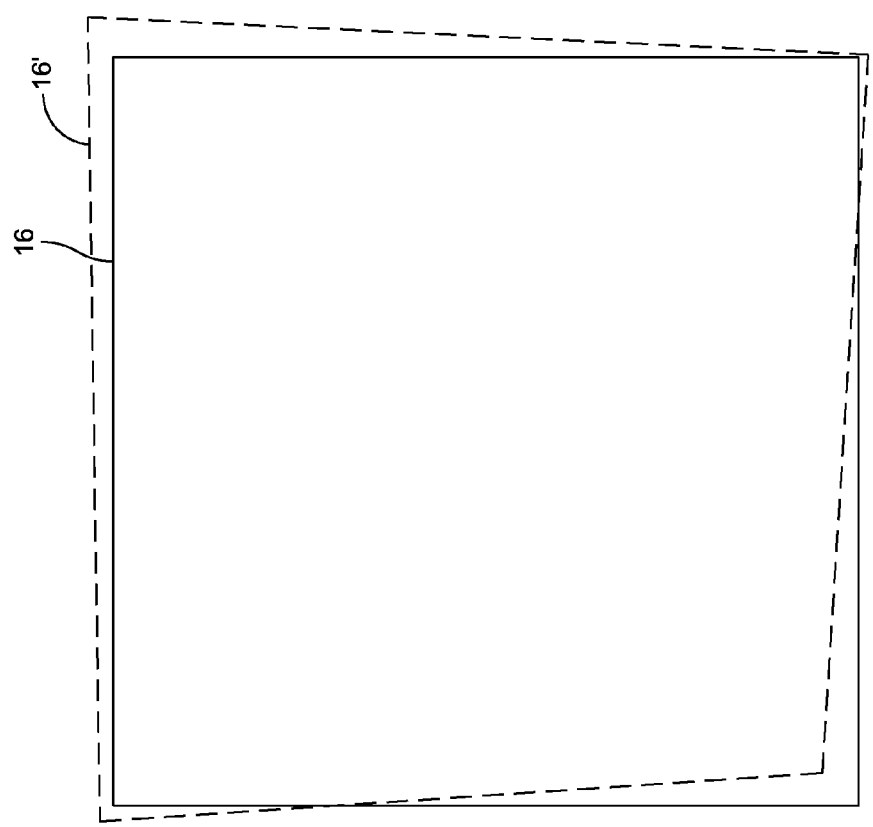
FIG. 8 is a diagram illustrating that, from an initial state where a structure may be ideally a rectangle or square (solid lines), uneven thermal expansion can distort the dimensions of the structure (dashed lines) causing relative angles between the faces of the structure.

Antenna array support structures, as well as the structures that support other alignment-critical sensors and emitters often expand, contract and flex during the course of a day and over longer time periods. For example, FIG. 8 is a diagram illustrating an initial state of a structure, such as deckhouse 16, which is ideally a rectangle or square (solid lines). However, uneven thermal expansion can distort the dimensions, resulting in structure 16' (dashed lines). This creates changes in the relative alignment between sensors and emitters, and these changes in relative alignment affect their ability to perform their specific missions. Even relatively small structural distortions are potentially significant sources of error between elements that are covering different volumes of space for combat system engagements that require precision and accuracy. When a target track passes from the volume of coverage of one antenna array element into another element's volume of coverage, a small angular error can become a large Cartesian error. When an engagement is performed in true coordinates, this Cartesian error can be significant and cause a failure to complete the engagement successfully.

As set forth above, embodiments of the present disclosure may physically measure the relative alignment between the element sensors and emitters from within the physical structure, and to tie those measurements to the legacy measurement processes during a concurrent initialization event. The initial biases between internal positions and external, legacy positions are simplified into an Euler azimuthal bias (FIG. 5), an Euler elevation bias (FIG. 6), and an Euler crossroll bias (FIG. 7) per radar array by measurements that are taken coincident in time by a legacy method outside the structure and by a method similar to the legacy method inside the structure. Subsequent measurements made inside the structure can be utilized to correct for structural deformations that cause the relative angles between radar arrays to change similar to what is simply described by FIG. 8, where the nominal square rectangle can be thermally expanded on facets of the structure facing the sun relative to the facets of the structure in the shade of the structure.

Figure 9:
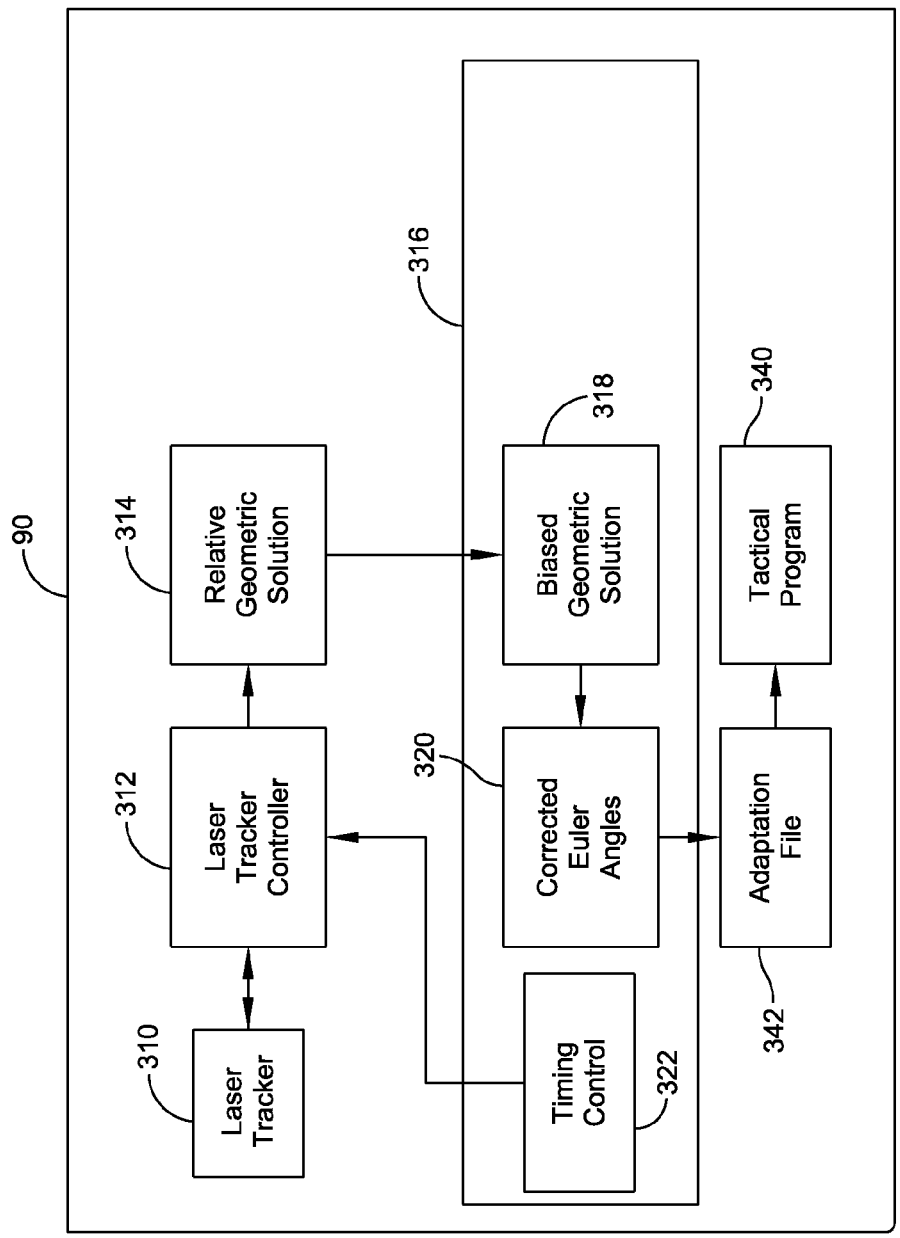
FIG. 9 is a simplified block diagram illustrating a system according to an embodiment of the present disclosure.

FIG. 9 illustrates an exemplary system 90 for performing the above-described process according to an embodiment of the present disclosure. Exemplary system 90 includes at least one laser tracker 310 and a corresponding controller 312 responsive to a system timing control signal 322 for ensuring proper timing (e.g. simultaneous) between, for example, interior and exterior alignment measurements of the deckhouse and/or antenna arrays. Data received from laser tracker(s) 310 is provided to a processor 314 for developing a geometric portrait of the current system position. A calibration subsystem 316 includes a bias processor 318 for calculating measured biases between initial calibration measurements, which may be stored into a system memory device for real-time system measurements from the laser tracker(s). A correction processor 320 may be provided for calculating corrected Euler Angles in view of any measured biases. These correction angles or factors may be uploaded to the radar system's tactical program 340, or control processor(s) via an adaptation file 342 for adjusting the effective pointing direction of the antenna array(s) in response to the measured physical alignment biases. As noted, these biases may be calculated and recalculated continuously, or periodically, thus providing for continuous array pointing correction. It should be understood that the algorithms to perform these transformations are geometric and algebraic, and have not been included for the purposes of brevity.

This process aligns arrays internal to a structure initially at the same time as traditional external measurements. Additional targets are mounted on the back of planar arrays that would correlate to targets on the exterior face of the array and establish permanent target positions within the structure. Permanent laser tracker positions could be set up to automate readings. Readings are performed at intervals deemed necessary for updating calibrations. The internal alignment measurements can be verified or compared against external measurements, fixed or live targets. This process capability could make it easier for a small set of true references to be measured to maintain calibration for precision missions, as fewer reference measurements would be necessary to achieve this precision and accuracy objective. As a result, the radar's combat system alignment will improve as a process for continuously measuring the orientation of planar radar array faces using a laser tracker to mitigate misalignment caused by thermal structural flexure.

Embodiments of the present disclosure may take a complete set of precision alignment measurements in a short time and calculate calibration values to correct for the current structural flexure. This removes the unknown error budget component for structural flexure for a combat system engagement. Tying this calibration in with a current measurement relative to true by a sensor calibrates all sensors and emitters on this structure to true coordinates. This allows a complete calibration of alignment relative to true coordinates in minutes, which would be accurate for the time of even an extended engagement.

In one embodiment, a primary alignment reference system may be defined by benchmarks exterior to the structure platform that define a centerline plane, which is perpendicular to a horizontal plane defined by the platform. This reference system and the measurement of as-installed orientation angles of these planar arrays using exterior reference points exist. Taking these measurements exterior to the structure on a somewhat continuous basis is not practical.

A secondary alignment reference system may be defined (for this process) within the structure that will be a common reference system for continued measurements within the structure. There will be primary reference points (at least 3 points) (and secondary (check) points (at least 3 points) within this reference system. Measurements to a minimum of three (3) points on the backside of each planar array will initially be made at a coincident time with an exterior measurement for calibration. Subsequent measurements will be made on command to support the tactical environment or on a timed period (determined by learned historical data) to utilize the calibration (deltas) to transform from interior measurements to exterior referenced values.

It should also be understood that embodiments of the present disclosure are capable of taking a complete set of precision alignment measurements in a short time and calculating calibration values to correct for the current structural flexure. This removes the need for the unknown error budget component of the legacy method to account for structural flexure and other distortions that were not measured. Tying this calibration in with a current measurement relative to a true position by a sensor may be used to calibrate all sensors and emitters on a structure to true coordinates. This allows a complete calibration of the alignment relative to true coordinates, ideally in minutes, which should hold accurate for the time of even an extended engagement.

This illustration is provided by way of example only, and other systems for implementing the bias measurements and correction calculations and algorithms described herein may be contemplated by one of skill in the pertinent art without departing from the intended scope of this disclosure. For example, the process may be implemented, by way of example, to include memory containing instructions, the instructions when executed by a processor, cause the steps of the process to be performed. It is understood that the processing steps may also be performed in hardware, for example in a field programmable gate array (FPGA) or a complex programmable logic device (CPLD). Thus, the whole process or any part thereof, may be performed in hardware, software or any combination of hardware and/or software. Software may be embodied in a non-transitory machine readable medium upon which software instructions may be stored, the stored instructions when executed by a processor cause the processor to perform the described steps. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for adapting the pointing of a radar system in response to distortion of a support structure supporting at least one antenna array, the method comprising the steps of:

making measurements by at least one laser tracker located within the support structure, the measurements made between the at least one laser tracker and at least one laser target mounted within the support structure;

correlating measurements made within the support structure with measurements made external to the support structure to thereby establish an initial condition; and comparing measurements made within the support structure to the initial condition to determine bias introduced into the support structure.

2. The method according to claim 1, further comprising the step of:

making measurements from locations external to the support structure;

wherein the step of making measurements external to the support structure occurs simultaneously with the step of making measurements within the support structure.

3. The method according to claim 1, wherein the step of making measurements between at least one laser tracker located on the support structure within the support structure and at least one laser target mounted within the support structure includes the step of making angular measurements.

4. The method according to claim 1, wherein measured biases are provided to a radar processor of the radar system for adapting the pointing of the at least one antenna array.

5. The method according to claim 1, wherein the steps of making measurements between at least one laser tracker located within the support structure and at least one laser target mounted within the support structure and comparing said measurements to a predetermined value to determine bias introduced into the structure are repeated periodically.

6. The method according to claim 1, wherein the step of making measurements between at least one laser tracker located within the support structure and at least one laser target mounted within the support structure includes making measurements between at least one laser tracker and a plurality of laser targets.

7. The method of claim 6, wherein the plurality of laser targets comprises at least three laser targets arranged on the at least one antenna array.

8. The method of claim 7, wherein the at least one antenna array comprises a plurality of antenna arrays, each antenna array comprising at least three laser targets arranged thereon.

9. A radar system comprising:

an antenna array;

a support structure supporting the antenna array at an interface between an interior and exterior of the support structure, the support structure being subject to environmental distortion which perturbs the pointing of the antenna array relative to its local environment;

a laser tracker and laser reflector system located within the interior of the support structure for measuring alignment biases of the antenna array; and a processor configured to:

correlate measurements made within the support structure with measurements made external to the support structure to thereby establish an initial condition; and compare measurements made within the support structure to the initial condition to determine bias introduced into the support structure.

10. The radar system according to claim 9, wherein the antenna array comprises a plurality of antenna arrays.

11. The radar system according to claim 9, wherein the laser reflector system includes a plurality of laser retroreflectors mounted to at least one of the interior of the support structure and the antenna array.

12. The radar system according to claim 11, wherein the laser reflector system includes at least three retroreflectors mounted to an interior facing surface of the antenna array.

13. The radar system according to claim 9, further comprising a radar adaptation processor for adjusting the pointing of the antenna array in response to the measured alignment biases.

14. The radar system according to claim 9, further comprising an external measurement system for making measurements between a location external to the support structure and the exterior surface of the support structure.

15. The radar system according to claim 9, further comprising a timing control processor for correlating the internal and external measurements of the support structure.

* * * * *